United States Patent
Chis et al.

(10) Patent No.: US 12,114,023 B2
(45) Date of Patent: Oct. 8, 2024

(54) CLOUD BYTE STREAM ALIGNMENT METHOD

(71) Applicant: Harman International Industries, Incorporated, Stamford, MI (US)

(72) Inventors: Cristian Chis, Commerce Township, MI (US); Timothy Raymond VanGoethem, Milford, MI (US); Jabir Kannathvalappil Moidunny, Thrissur (IN)

(73) Assignee: Harman International Industries, Incorporated, Stamford, CT (US)

( * ) Notice: Subject to any disclaimer, the term of this patent is extended or adjusted under 35 U.S.C. 154(b) by 45 days.

(21) Appl. No.: 17/774,211

(22) PCT Filed: Dec. 23, 2020

(86) PCT No.: PCT/US2020/066757
§ 371 (c)(1),
(2) Date: May 4, 2022

(87) PCT Pub. No.: WO2021/133865
PCT Pub. Date: Jul. 1, 2021

(65) Prior Publication Data
US 2022/0353554 A1  Nov. 3, 2022

(30) Foreign Application Priority Data
Dec. 26, 2019  (IN) .............................. 201941053874

(51) Int. Cl.
*H04M 9/08* (2006.01)
*H04B 3/23* (2006.01)
*H04L 65/75* (2022.01)
*H04L 65/80* (2022.01)
*H04N 21/233* (2011.01)
*H04N 21/2387* (2011.01)
*H04N 21/24* (2011.01)
*G10L 15/20* (2006.01)

(52) U.S. Cl.
CPC ........... *H04N 21/233* (2013.01); *H04L 65/75* (2022.05); *H04L 65/80* (2013.01); *H04N 21/2387* (2013.01); *H04N 21/2407* (2013.01); *G10L 15/20* (2013.01); *H04M 9/08* (2013.01)

(58) Field of Classification Search
CPC ...................................................... G10L 15/20
See application file for complete search history.

(56) References Cited

U.S. PATENT DOCUMENTS

| | | | |
|---|---|---|---|
| 10,297,250 B1 * | 5/2019 | Blanksteen | G10L 15/32 |
| 2014/0154968 A1 | 6/2014 | Root et al. | |
| 2016/0014373 A1 * | 1/2016 | LaFata | H04M 9/082 348/14.08 |

(Continued)

*Primary Examiner* — Hsiungfei Peng
(74) *Attorney, Agent, or Firm* — Angela M. Brunetti

(57) ABSTRACT

A method for selecting an audio signal for alignment to compensate for the latency that is introduced by content being sent, such as from an end device, over a network to a cloud based or other computing environment located remote from the end unit. Audio that is processed in the cloud is also being sent back to the end device. Selection may be accomplished using a loop back method, a Time Stamp (TS) method or a Ping method. The Ping method allows incoming and outgoing audio signals to be selected and processed in the cloud.

10 Claims, 4 Drawing Sheets

(56) References Cited

U.S. PATENT DOCUMENTS

2016/0125892 A1* 5/2016 Bowen .................... G10L 15/20
                                                        704/226
2019/0181911 A1   6/2019 Schulz

* cited by examiner

CLOUD BYTE STREAM ALIGNMENT METHOD

TECHNICAL FIELD

The present disclosure is directed to a method for selecting a signal to be processed in a cloud component and re-synchronized between the cloud component and an end device.

BACKGROUND

Echo Noise Cancellation Reduction (ECNR) improves performance of telephony, conferencing, voice recognition, mobile devices, and smart speaker systems. This is particularly applicable to hands-free audio in a vehicle environment where audio noise coupling may include noise from a vehicle audio system, engine noise, road noise, noise from the climate control system, wind noise, audio from a hands-free telephone conversation, and other cabin noise to name just a few examples. The computational components for processing audio in this manner require both an input stream and an output stream to perform their function. Only limited misalignment between the input and output streams may be tolerated. For example, within an ECNR system co-located in the vehicle a 5 ms delay between a speaker stream and a microphone stream associated with the delivery/reception of these audio streams is manageable. When ECNR or other processing is carried out in a cloud, delivery/reception of these streams may be delayed significantly from what typically occurs in the vehicle because the streams are being transmitted over a network to a cloud-based processor. The latency introduced by moving processing components to the cloud is not only bigger, but also variable, thereby complicating the determination of audio signals that are to be processed, for example, by a cloud based ECNR block.

There is a need to resolve the time misalignment of streams into and out of a cloud-based ECNR so that the ECNR can perform its function of detecting and cancelling echo and noise.

SUMMARY

The inventive subject matter is directed to a method for selecting an audio stream for alignment to compensate for the latency that is introduced by content being sent, such as from a vehicle, an internet protocol phone, or an intelligent speaker, over a network to be processed at an ECNR block in the cloud, or some other computing environment located outside of the vehicle. Audio that is processed by the ECNR block in the cloud is also being sent back to an end device at the vehicle. Selection of the proper audio signal to be processed may be accomplished using a loop back method, a Time Stamp (TS) method or a Ping method. The Ping method also allows incoming and outgoing audio signals to be selected and processed at the ECNR block.

Elements and steps in the figures are illustrated for simplicity and clarity and have not necessarily been rendered according to any sequence. For example, steps that may be performed concurrently or in different order are illustrated in the figures to help to improve understanding of embodiments of the present disclosure.

DETAILED DESCRIPTION

While various aspects of the present disclosure are described with reference to an illustrative embodiment, the present disclosure is not limited to such embodiments, and additional modifications, applications, and embodiments may be implemented without departing from the present disclosure. In the figures, like reference numbers will be used to illustrate the same components. Those skilled in the art will recognize that the various components set forth herein may be altered without varying from the scope of the present disclosure.

Any one or more of the servers, receivers, or devices described herein include computer executable instructions that may be compiled or interpreted from computer programs created using a variety of programming languages and/or technologies. In general, a processor (such as a microprocessor) receives instructions, for example from a memory, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof. Any one or more the devices herein may rely on firmware, which may require updates from time to time to ensure compatibility with operating systems, improvements and additional functionality, security updates or the like. Connecting and networking servers, receivers or devices may include, but are not limited to, SATA, Wi-Fi, lightning connector, USB, Ethernet, UFS, 5G, etc. One or more servers, receivers, or devices may operate using a dedicated operating system, multiple software programs and/or platforms for interfaces such as graphics, audio, wireless networking, enabling applications, integrating hardware of vehicle components, systems, and external devices such as smart phones, tablets, and other systems to name just a few.

Figure 1:
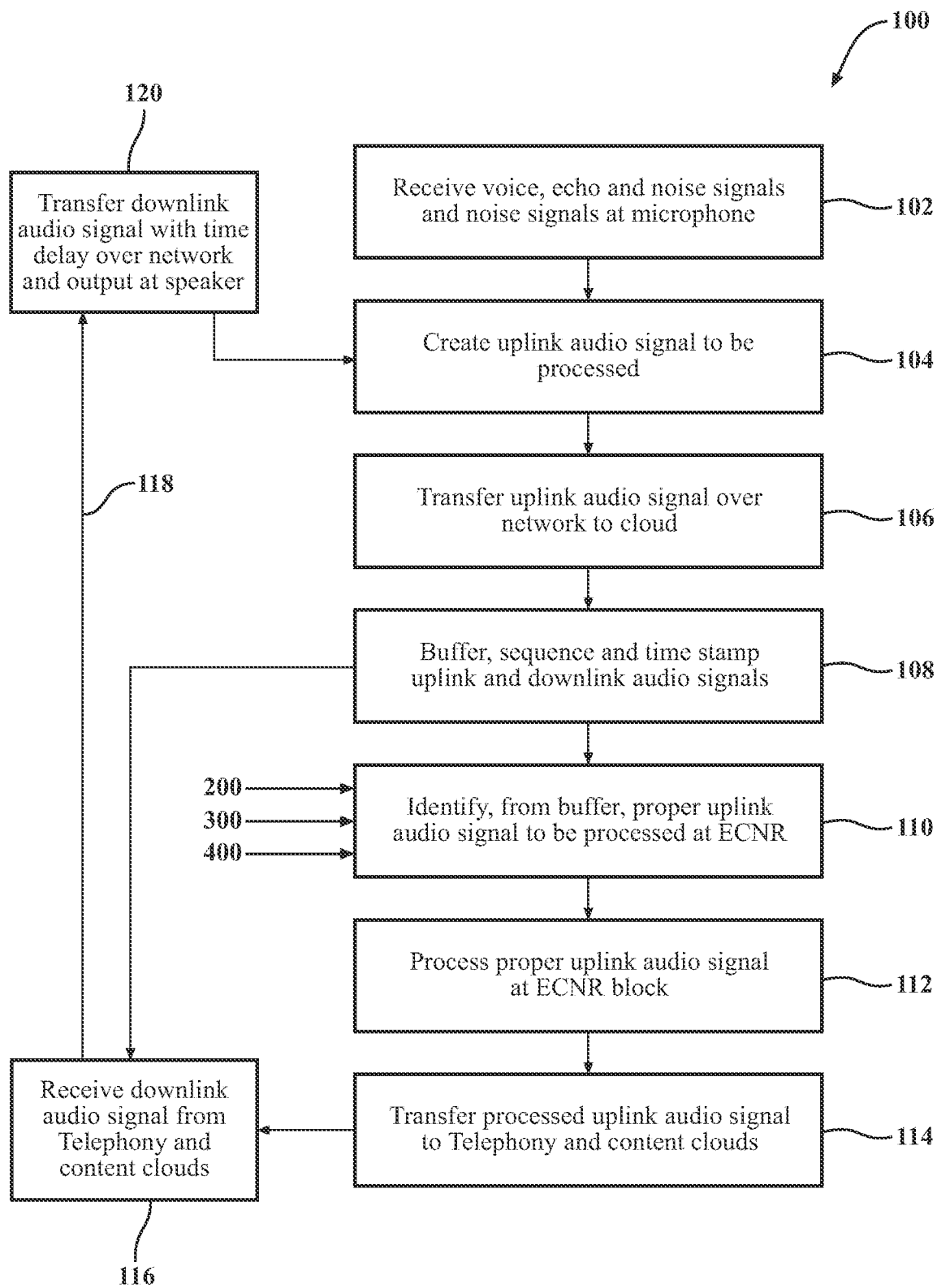
FIG. 1 is a flow diagram of a method for selecting an audio sample for cloud based ECNR on uplink and downlink audio streams.

FIG. 1 illustrates a flow diagram of a method 100 for cloud-based Echo Noise Cancellation Reduction (ECNR) of audio signals. The description herein is being applied to a vehicle-based audio system that is connected over a network to a cloud provider and to telephony and content cloud providers. However, it should be noted that the inventive subject matter is not limited to an in-vehicle application and may also apply to smart speakers, an IP conferencing system, or the like. In each instance, audio signal processing is carried out in a cloud. Voice, echo, and noise signals are received 102, for example, by a microphone in a vehicle interior. An uplink audio sample to be processed is created 104 from the received voice, echo, and noise signals. The uplink audio sample to be processed is transmitted 106 to the cloud over a network. Within the cloud, the uplink audio sample to be processed is sequenced, time stamped and buffered.

Throughout the process to this point, latency is introduced as the uplink audio is being transmitted to the cloud. This latency is variable and is affected by network speed, a distance the signal travels, and other factors. Therefore, from the buffer, a proper uplink audio sample to be processed is identified 110, selected and sent to an ECNR block for processing 112. Any one of methods 200, 300, and 400 may be employed to resolve time misalignment of streams of audio into and out of the ECNR and identify the proper uplink audio sample to be processed at the ECNR. Method 200 applies a loopback method for the step of identifying 110 the proper uplink audio sample to be processed and will be described later herein with reference to the system shown in FIG. 2. Method 300 applies a Time Stamp method to the step of identifying 110 the proper uplink audio sample to be processed and will be described later herein with reference to the system shown in FIG. 3. Method 400 applies a Ping method to the step of identifying 110 the proper uplink audio sample to be processed and will be described later herein with reference to the system shown in FIG. 4.

Referring again to FIG. 1, once the proper uplink audio sample to be processed has been identified 110 and processed 112 by the ECNR block, the processed uplink audio sample is transmitted 114 to telephony and content clouds. A downlink audio sample is received 116 from the telephony and content clouds. The downlink audio sample is time stamped and transmitted 118, again with added time delays, over the network where it is output 120 at a speaker, for example a speaker of the audio system in the vehicle.

Audio computational components require both an output stream and an input stream to perform their function. In many instances only a limited misalignment in time between the streams is tolerable. This alignment is difficult to achieve when the processing is done remotely, such as in a cloud-based processor, and the delivery and/or reception of the streams are in a vehicle which may be several hundred miles away from the cloud-based processor.

Figure 2:
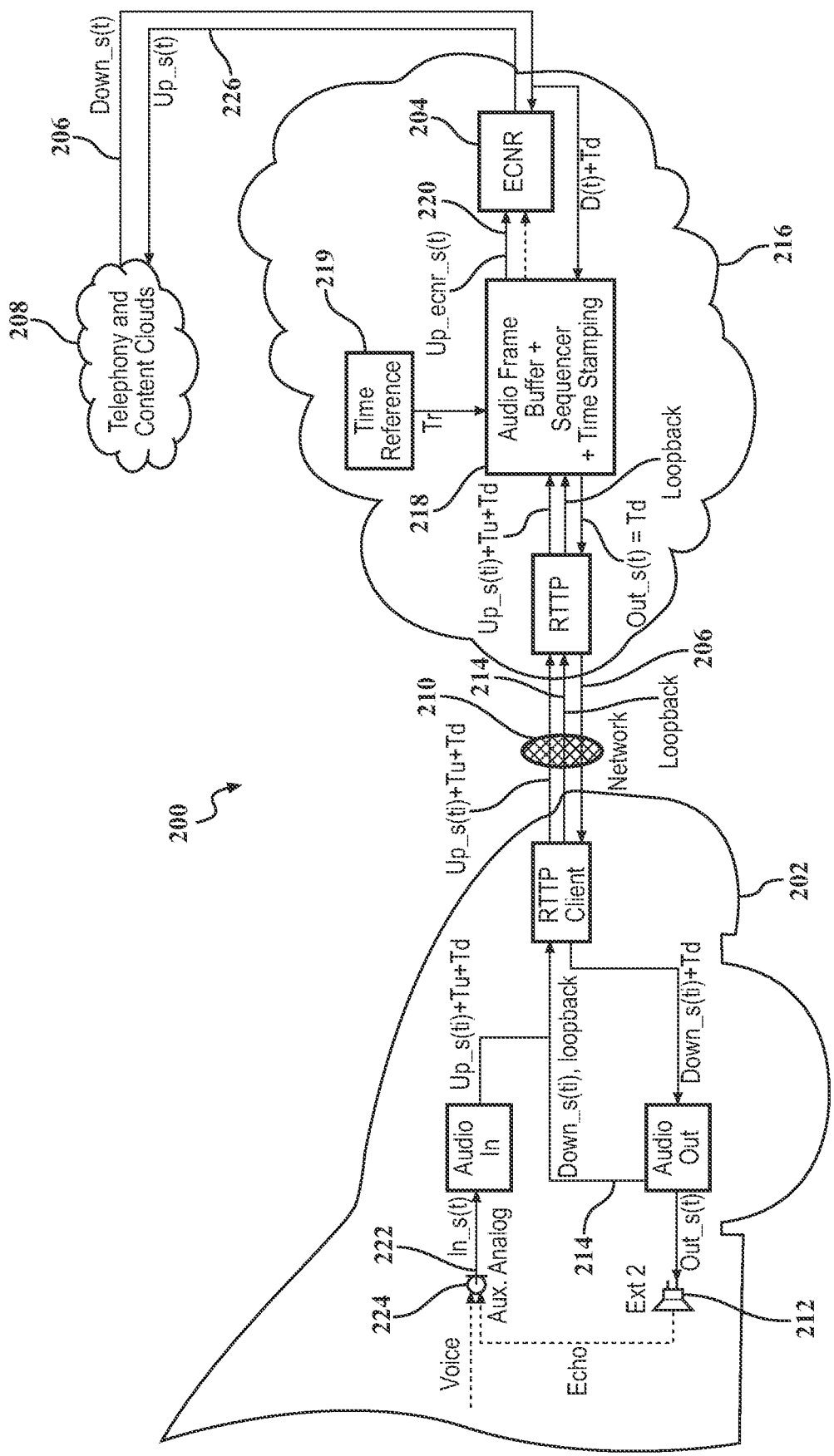
FIG. 2 is a block diagram of a system showing data streams flowing between an audio system on a vehicle and a cloud based ECNR block.

FIG. 2 is a block diagram of a system 200 showing audio data streams flowing between an audio system 202, such as a vehicle audio system, a smart speaker, or an IP conferencing system, and a cloud-based ECNR 204. Loop back audio 214 will be used by the method in FIG. 1 and applied to the step 110 of identifying, from the buffer, sequencer, and time alignment block 218, a proper uplink audio sample to be processed 220 at the cloud based ECNR 204. An uplink audio signal 222 is created from voice, echo and noise signals received at microphone 224. A downlink audio signal 206 is transmitted from telephony and content clouds 208 back to the audio system 202 over a network 210, where it is output at a speaker 212 and looped back 214 to be routed with the uplink audio sample to be processed over the network 210 to cloud 216. In the method 200 shown in FIG. 2, the uplink audio signal 222 along with the downlink audio signal 214 to be looped back are both aligned in time and sent over the network 210.

When audio signals 222, 214 arrive at the cloud 216 for processing, prior to being selected, they are buffered, sequenced and time stamped at block 218 with respect to a time reference 219. According to the loop back time, the proper uplink audio sample to be processed 220 is identified and then selected from the buffer. The selected uplink audio sample is processed at the ECNR 204. The processed signal 226 is sent on to the telephony and content cloud 208 and downlink audio 206 is returned to the ECNR 204, where it is time stamped at block 218 transmitted over the network 210 and played back at the speaker 212 of the audio system 202.

Figure 3:
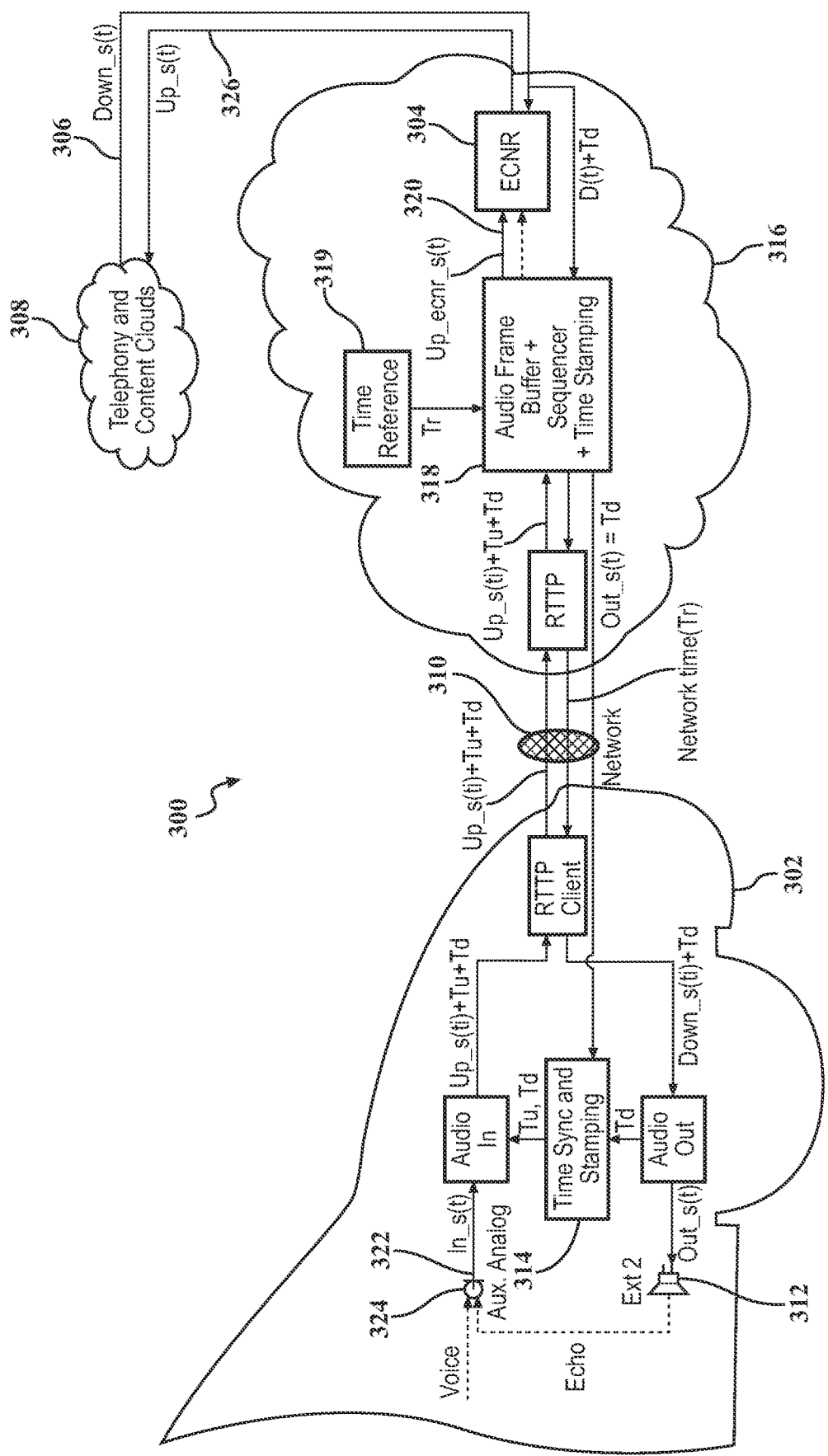
FIG. 3 is a block diagram of a system showing data streams flowing between an audio system on a vehicle and a cloud based ECNR block incorporating Time Stamp (TS)

FIG. 3 is a block diagram of a system 300 showing audio data streams flowing between an audio system 302, such as a vehicle audio system, a smart speaker, or an IP conferencing system, and a cloud-based ECNR block 304. The Time Stamp system shown in FIG. 3 is used by the method in FIG. 1 to the step 110 of identifying, from the buffer at block 318, a proper uplink audio sample to be processed 320 at the cloud based ECNR block 304. An uplink audio signal 322 is created from voice, echo and noise signals received by microphone 324 and time stamped 314. The uplink signal time stamp, Tu, is added to the uplink audio signal 322 being transmitted over a network 310.

A downlink audio signal 306 is transmitted from telephony and content clouds 308 back to the vehicle audio system 302 over a network 310, where it is output at a speaker 312. The downlink audio sample is also time stamped 314. The downlink signal time stamp Td is combined with the uplink signal time stamp Tu and the uplink audio signal 322 that is transmitted over the network 310.

When the uplink audio signal 322 and time stamps Tu and Td arrive at a cloud 316, they are buffered, sequenced and time stamped at block 318 again with respect to a time reference 319 prior to being selected. A proper uplink audio sample to be processed 320 is identified and selected from the buffer at block 318 by coordinating the time stamps Tu, Td with a time reference Tr, to be processed at the ECNR block 304. A processed signal 326 is sent on to the telephony and content cloud 308 and downlink audio signal 306 is returned to the ECNR block 304 and again, time stamped at block 318 before being transmitted over the network 310 and played back at speaker 312 of the audio system 302.

The time stamp method described with reference to FIG. 3 has an advantage in that only the time stamp Td associated with the downlink audio signal and not the entire down link audio signal is being looped back and transmitted over the network 310. This is advantageous in that less data is being streamed. It transmits faster and in a more cost-effective manner than the loop back method described with reference to FIG. 2.

Figure 4:
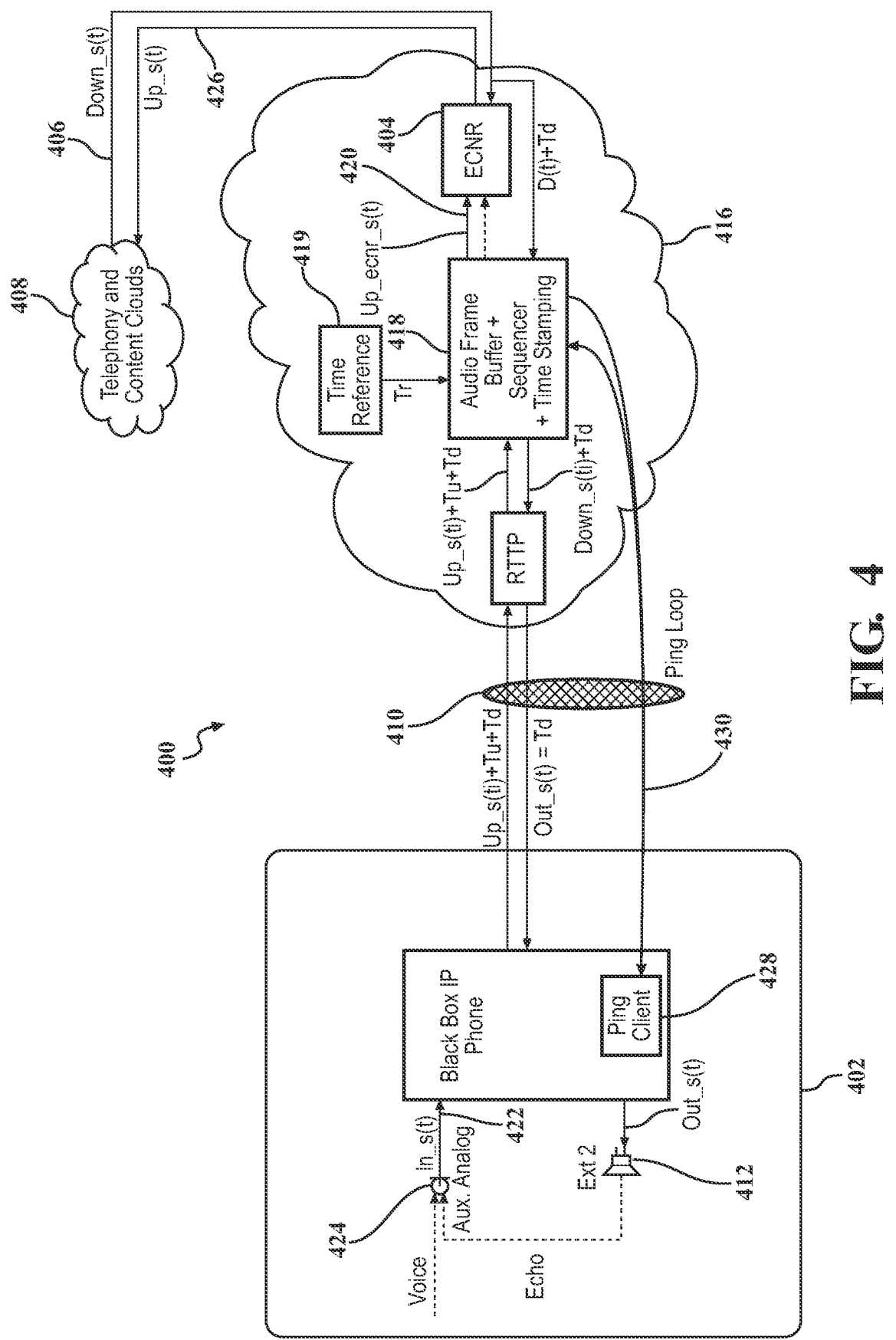
FIG. 4 is a block diagram of a system showing data streams flowing between an audio system on a vehicle and a cloud based ECNR block incorporating a ping loop.

FIG. 4 is a block diagram of a system 400 showing audio data streams flowing between an audio system 402, such as a vehicle audio system, a smart speaker, or an IP conferencing system, and a cloud based ECNR block 404. The ping loop system shown in FIG. 4 is used by the method in FIG. 1 to the step of identifying, from the buffer 418, a proper uplink audio sample to be processed 420 at the cloud based ECNR 404.

An uplink audio signal 422 is created from voice, echo and noise signals received by microphone 424 at the audio system 402. A ping 430 is looped over the network 410 between a ping client 428 at the audio system 402 and a buffer at block 418 in cloud 416. Instead of time stamping the audio signals as described above, the amount of time it takes to send the uplink audio signal 422 to the cloud 416 is the amount of time delay used to identify and select, from the buffer at block 418, the audio signal to be processed 420 at the ECNR block 404. A processed audio signal 426 is sent on to the telephony and content cloud 408 and downlink audio signal 406 is returned to the ECNR block 404 and again, time stamped at block 418 before being transmitted over the network 410 and played back at speaker 412 of the audio system 402.

A downlink audio signal 406 is transmitted from telephony and content clouds 408 back to the vehicle audio system 402 over a network 410, where it is output at a speaker 412. A distinct advantage of the ping loop method is that the ping may be continuously aligned to accommodate any variation is latency. Also, a ping is universal. It is not specific to a cloud provider. Therefore, it may be used to resolve time misalignment of the uplink and the downlink audio signals. Therefore, the ECNR may clean up the downlink signal, in a manner like the uplink signal to be processed 420, before returning the downlink audio signal 406 over the network 410 to the audio system 402 for playback at the speaker 412.

In the foregoing specification, the present disclosure has been described with reference to specific exemplary embodiments. Various modifications and changes may be made, however, without departing from the scope of the present disclosure as set forth in the claims. The specification and figures are illustrative, rather than restrictive, and modifications are intended to be included within the scope of the present disclosure. Accordingly, the scope of the present disclosure should be determined by the claims and their legal equivalents rather than by merely the examples described.

For example, the steps recited in any method or process claims may be executed in any order and are not limited to the specific order presented in the claims. The equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Benefits, other advantages, and solutions to problems have been described above regarding example embodiments; however, any benefit, advantage, solution to problem or any element that may cause any particular benefit, advantage, or solution to occur or to become more pronounced are not to be construed as critical, required, or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited but may also include other elements not expressly listed or inherent to such process, method, article, composition or apparatus. Other combinations and/or modifications of the above-described structures, arrangements, applications, proportions, elements, materials, or components used in the practice of the present disclosure, in addition to those not specifically recited, may be varied, or otherwise particularly adapted to specific environments, manufacturing specifications, design parameters or other operating requirements without departing from the general principles of the same.

The invention claimed is:

1. A method for cloud-based Echo Noise Cancellation Reduction (ECNR) in audio signals originating in an audio system and played back at an end device, the method comprising the steps of:
   receiving, at a microphone of the audio system, a buffered, sequenced, and time-stamped uplink audio signal;
   transmitting the uplink audio signal over a network to a cloud based ECNR;
   receiving, at the ECNR, a downlink audio signal from a content cloud;
   at the cloud based ECNR, buffering, sequencing and time stamping the uplink and downlink audio signals for a second time with a reference time stamp;
   identifying from the buffer at the cloud based ECNR, a proper uplink audio signal;
   selecting the identified proper uplink audio signal;
   transmitting the proper uplink audio signal from the ECNR to the content cloud; and
   transmitting the downlink audio signal over the network to be played back at a speaker at the end device.

2. The method of claim 1 wherein the step of identifying and selecting a proper uplink audio signal further comprises the steps of:
   looping back the downlink audio signal with the uplink audio signal over the network to the ECNR; and
   selecting, from the buffered and sequenced audio signals going into and coming out of the ECNR, the audio signal that matches the looped back downlink audio signal to be the proper uplink audio signal.

3. The method of claim 1 wherein the step of selecting the proper uplink audio signal further comprises the steps of:
   combining the uplink audio signal with the time stamp for the downlink audio signal; and
   selecting, from the buffered and sequenced audio signals going into and coming out of the ECNR, the audio signal that matches the time stamp for the downlink audio signal to be the proper uplink audio signal.

4. The method of claim 1 wherein the step of selecting the proper uplink audio signal to be processed further comprises the steps of:
   looping a ping between the audio system and the cloud to measure a time delay;
   continuously aligning the ping with the uplink audio signal; and
   selecting, from the buffered and sequenced audio signals going into and coming out of the ECNR, the audio signal that matches the time delay of the ping as the proper uplink audio signal.

5. The method of claim 4 wherein the step of receiving at the ECNR a downlink audio signal further comprises the steps of:
   continuously aligning the ping with the downlink audio signal;
   processing the downlink audio signal at the ECNR; and
   transmitting a processed downlink audio signal to the audio system.

6. A system for cancelling echo noise in audio signals, the system comprising:
   an audio system having a microphone and a loudspeaker;
   buffered, sequenced, and time-stamped uplink audio signals received at the microphone;
   a cloud-based processor;
   a communication link between the audio system and the cloud-based processor for transmitting the uplink audio signals between the audio system and the cloud-based processor;
   the cloud-based processor buffering, sequencing and timestamping the uplink audio signal for a second time with respect to a reference time stamp, the cloud-based processor identifying and selecting, from the buffered, sequenced, and timestamped uplink audio signals, a proper uplink audio signal, the cloud-based processor processes the proper uplink audio signal for echo noise cancellation reduction; and
   the proper uplink audio signal is transmitted to a content cloud.

7. The system of claim 6 further comprising a downlink audio signal generated at the content cloud that is looped back with the uplink signal, the proper uplink audio signal is selected by detecting an audio signal that matches the looped back downlink audio signal.

8. The system of claim 6 further comprising:
a downlink audio signal;
a timestamp for the downlink audio signal; and
the proper uplink audio signal further comprises the audio signal that matches a combined uplink audio signal with the timestamp for the downlink audio signal.

9. The system of claim 6 further comprising:
a downlink audio signal;
a ping to measure a time delay, the ping is looped between the audio system and the cloud-based processor and continuously aligned with the uplink audio signals; and
the proper uplink audio signal is identified to be the audio signal that matches the time delay of the ping.

10. The system of claim 9 wherein the ping is continuously aligned with the downlink audio signal and the proper uplink audio signal is identified to be the audio signal that matches the time delay of the ping.

\* \* \* \* \*